(12) United States Patent
Mantor et al.

(10) Patent No.: US 9,142,057 B2
(45) Date of Patent: Sep. 22, 2015

(54) PROCESSING UNIT WITH A PLURALITY OF SHADER ENGINES

(75) Inventors: Michael Mantor, Orlando, FL (US);
Ralph C. Taylor, Deland, FL (US);
Jeffrey T. Brady, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 556 days.

(21) Appl. No.: 12/691,541

(22) Filed: Jan. 21, 2010

(65) Prior Publication Data

US 2011/0050716 A1 Mar. 3, 2011

Related U.S. Application Data

(60) Provisional application No. 61/239,718, filed on Sep. 3, 2009.

(51) Int. Cl.
*G09G 5/00* (2006.01)
*G06T 15/00* (2011.01)

(52) U.S. Cl.
CPC .................................. *G06T 15/005* (2013.01)

(58) Field of Classification Search
CPC ....... G06T 15/506; G06T 15/50; G06T 15/60; G06T 15/80; G06T 15/06; G06T 11/001; G06T 15/04; G06T 15/005; G06F 9/44458; G09G 5/363
USPC .......................................... 345/501–506, 581
See application file for complete search history.

(56) References Cited

U.S. PATENT DOCUMENTS

| 5,701,405 A | * | 12/1997 | Kelley et al. | 345/441 |
|---|---|---|---|---|
| 7,355,601 B2 | * | 4/2008 | Andrews et al. | 345/505 |
| 8,139,069 B1 | * | 3/2012 | Molnar et al. | 345/505 |
| 8,156,285 B2 | * | 4/2012 | Hady et al. | 711/130 |
| 8,332,592 B2 | * | 12/2012 | Hoover et al. | 711/146 |
| 2004/0075661 A1 | | 4/2004 | Yamaguchi et al. | |
| 2008/0074430 A1 | * | 3/2008 | Jiao et al. | 345/506 |
| 2009/0051687 A1 | | 2/2009 | Kato et al. | |
| 2009/0182948 A1 | * | 7/2009 | Jiao et al. | 711/133 |
| 2009/0309896 A1 | * | 12/2009 | DeLaurier et al. | 345/589 |

(Continued)

FOREIGN PATENT DOCUMENTS

| JP | 2008225893 | 9/2008 |
|---|---|---|
| JP | 2008538620 | 10/2008 |

(Continued)

OTHER PUBLICATIONS

International Search Report and Written Opinion for International Application No. PCT/US2010/047779, mailed on Dec. 13, 2010, 12 pages.

(Continued)

*Primary Examiner* — Todd Buttram
(74) *Attorney, Agent, or Firm* — Volpe and Koenig, P.C.

(57) ABSTRACT

A processor includes a first shader engine and a second shader engine. The first shader engine is configured to process pixel shaders for a first subset of pixels to be displayed on a display device. The second shader engine is configured to process pixel shaders for a second subset of pixels to be displayed on the display device. Both the first and second shader engines are also configured to process general-compute shaders and non-pixel graphics shaders. The processor may also include a level-one (L1) data cache, coupled to and positioned between the first and second shader engines.

27 Claims, 8 Drawing Sheets

(56) References Cited

U.S. PATENT DOCUMENTS

2009/0315909 A1* 12/2009 DeLaurier et al. ............ 345/589
2012/0147027 A1* 6/2012 Molnar et al. ................ 345/582

FOREIGN PATENT DOCUMENTS

| WO | WO2006/117683 A2 | 11/2006 |
| WO | WO2007/049610 A1 | 5/2007 |
| WO | WO2009/036314 A2 | 3/2009 |
| WO | WO 2009/068893 A1 | 6/2009 |

OTHER PUBLICATIONS

Niski et al., "Tile-Based Level of Detail for the Parallel Age," *IEEE Transactions on Visualization and Computer Graphics*, vol. 13, No. 6, Nov./Dec. 2007, pp. 1352-1359.
Technical Brief NVIDIA GeForce 8800 GPU Architecture Overview, Nov. 8, 2006, TB-02787-001_v01, pp. 1-45.
Official Action for European Patent Application No. 10 754 626.9, dated Sep. 3, 2013, 7 pages.
Nayfeh, B., et al., "Evaluation of Design Alternatives for a Multiprocessor Microprocessor," ISCA Proceedings of the 23rd Annual International Symposium on Computer Architecture, 1996, pp. 67-77.
Official Action for Chinese Application No. 201080049825.2, dated Mar. 31, 2014, 6 pages.
English translation of Official Action for Chinese Application No. 201080049825.2, dated Mar. 31, 2014, 8 pages.
Official Action for Japanese Application No. 2012-528078, dated Jun. 24, 2014, 4 pages.
English translation of Official Action for Japanese Application No. 2012-528078, dated Jun. 24, 2014, 4 pages.
"Snow Leopard New Function Preview," *Mac Fan*, Japan, Mainichi Communications Inc., Aug. 1, 2008, pp. 48-51, No. 8, vol. 16.
English Language Abstract of Japanese Publication No. 2008225893, 1 page, Sep. 2008.
English Language Abstract of Japanese Publication No. 2008538620, 2 pages, Oct. 2008.
Koji Nishi, "General Purpose Computing on GPU—ATI Stream and SDK," *The Institute of Electronics*, Information and Communication Engineers 2009, pp. SS23-SS26, Engineering Science Society Congress Lecture Papers, Sep. 1, 2009, 4 pages.

* cited by examiner

PROCESSING UNIT WITH A PLURALITY OF SHADER ENGINES

CROSS REFERENCE TO RELATED APPLICATIONS

This application claims benefit under 35 U.S.C. §119(e) to U.S. Provisional Patent Application No. 61/239,718, entitled "A Processing Unit with a Plurality of Shader Engines," to Mantor et al., filed Sep. 3, 2009, the entirety of which is hereby incorporated by reference as if fully set forth herein.

BACKGROUND OF THE INVENTION

1. Field of the Invention

The present invention is generally directed to computing operations performed in computer systems. More particularly, the present invention is directed to processing units that perform computing operations in computer systems.

2. Background

A graphics-processing unit (GPU) is a complex integrated circuit that is adapted to perform graphics-processing tasks. A GPU may, for example, execute graphics-processing tasks required by an end-user application, such as a video-game application. The GPU may be a discrete (i.e., separate) device and/or package or may be included in the same device and/or package as another processor (e.g., a CPU). For example, GPUs are frequently integrated into routing or bridge devices such as, for example, Northbridge devices.

There are several layers of software between the end-user application and the GPU. The end-user application communicates with an application-programming interface (API). An API allows the end-user application to output graphics data and commands in a standardized format, rather than in a format that is dependent on the GPU. Several types of APIs are commercially available, including DirectX® developed by Microsoft Corporation of Redmond, Washington and OpenGL® promulgated by Khronos Group. The API communicates with a driver. The driver translates standard code received from the API into a native format of instructions understood by the GPU. The driver is typically written by the manufacturer of the GPU. The GPU then executes the instructions from the driver.

The graphics-processing tasks performed by GPUs typically involve complex mathematical computations, such as matrix and vector operations. To efficiently perform these computations, GPUs typically include an array of processing elements, called a shader engine. The array of processing elements is organized into single-instruction, multiple-data (SIMD) devices. A shader engine executes a sequence of instructions, called a shader program. The data needed to execute the shader program is distributed in parallel to different processing elements of the shader engine. The different processing elements may then perform the same operation on different pieces of the data. In this way, a GPU can perform the complex mathematical computations required for graphics-processing tasks more quickly than a typical central-processing unit (CPU).

In the past, GPUs may have included different shader engines to execute the different shader programs required to complete a single graphics-processing task. For example, a single graphics-processing task may require the execution of at least two different shader programs: a vertex shader to manipulate vertices of a triangle; and a pixel shader to determine pixels to be displayed on a display device (e.g., computer screen). To perform these two sets of computations, a typical GPU may have included two different shader engines: (i) a first shader engine to perform the vertex shader; and (ii) a second shader engine to perform the pixel shader.

Recently, GPUs have been designed to include a unified shader engine. A unified shader engine includes an array of processing elements capable of performing several different types of shader programs. A unified shader engine may execute, for example, a vertex shader, a geometry shader, and a pixel shader—with each shader recirculating through the array of processing elements of the unified shader, rather than progressing to different shader engines in a pipeline. In addition to the typical graphics-processing tasks (e.g., vertex shaders, geometry shaders, pixel shaders, etc.), unified shader engines have also been used more recently to perform general-compute operations (e.g., mathematical algorithms, physics simulations, etc.).

To remain competitive, the compute power of the GPU should continually increase to keep up with consumer demand and advances in the requirements of end-user applications and APIs. One way to increase the compute capability of a GPU is to increase the number of processing elements in the array of the shader engine. However, to provide workloads and data to the increased number of processing elements, the input/output busses feeding the processing elements would need to correspondingly increase just to maintain presently available capabilities of a GPU.

A potential solution for increasing the compute power of a GPU is to increase the width of the SIMDs included in the shader engine. However, this solution would have problems with SIMD divergence. SIMD divergence occurs when different threads running on a SIMD device take different directions in a branch instruction of a shader program. For example, a shader program may have a branch instruction as illustrated in Table 1. SIMD divergence would occur, for example, if a first thread running on a SIMD device enters the "if" section (i.e., operation 1) of the branch instruction and a second thread running on the SIMD device enters the "else" section (i.e., operation 2) of the branch instruction. In this scenario, the second thread (which entered the "else" section) would have to wait for the first thread (which entered the "if" statement). The waiting associated with SIMD divergence costs a shader program additional time to execute. Due to the potential for SIMD divergence, simply increasing the width of the SIMDs may not be a viable option for increasing the compute power of a GPU.

TABLE 1

```
if(condition){
    operation 1;
}
else{
    operation 2;
}
```

Another potential solution for increasing the compute power of a GPU is to increase the stack of processing elements (e.g., SIMDs) in the array of the shader engine. However, this solution is problematic for several reasons. As an initial matter, increasing the stack of processing elements could result in an elongated chip, potentially creating manufacturing issues. In addition, increasing the stack of processing elements creates an increased input latency associated with providing workloads to the stack and an increased output latency associated with routing the results from the stack. Moreover, there would be an increased latency for providing data (e.g., state data) to the stack. Thus, simply increasing the depth of the stack of the processing elements may not be a viable option for increasing the compute power of a GPU.

Given the foregoing, what is needed is a GPU with increased compute power and applications thereof.

BRIEF SUMMARY OF EMBODIMENTS OF THE INVENTION

The present invention meets the above needs by providing a processor with increased compute power and applications thereof Rather than increasing the width or depth of a single shader engine of a processor, an embodiment of the present invention provides a processor with a plurality of shader engines.

For example, according to an embodiment of the present invention, a processor includes a first shader engine and a second shader engine. The first shader engine is configured to process pixel shaders for a first subset of pixels to be displayed on a display device. The second shader engine is configured to process pixel shaders for a second subset of pixels to be displayed on the display device. Both the first and second shader engines are also configured to process general-compute shaders and non-pixel graphics shaders. The processor may also include a level-one (L1) data cache, coupled to and positioned between the first and second shader engines.

In another embodiment, the processor is defined in software. In this embodiment, a computer-program product includes a computer-readable storage medium containing instructions which, if executed on a computing device, define the processor.

In a further embodiment, the processor is included in a computing system. In this embodiment, the computing system includes a memory, a processing unit, and a bus coupled to the memory and the processing unit. An example computing system may include, but is not limited to, a supercomputer, a desktop computer, a laptop computer, a video-game device, an embedded device, a handheld device (e.g., a mobile telephone, smart phone, MP3 player, a camera, etc.), or some other device that includes or is configured to include a processor.

A still further embodiment provides a method for processing shaders in a processor. According to this method, a first shader engine processes pixel shaders for a first subset of pixels to be displayed on a display device, and a second shader engine processes pixel shaders for a second subset of pixels to be displayed on the display device. Both the first and second shader engines also process general-compute shaders and non-pixel graphics shaders.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
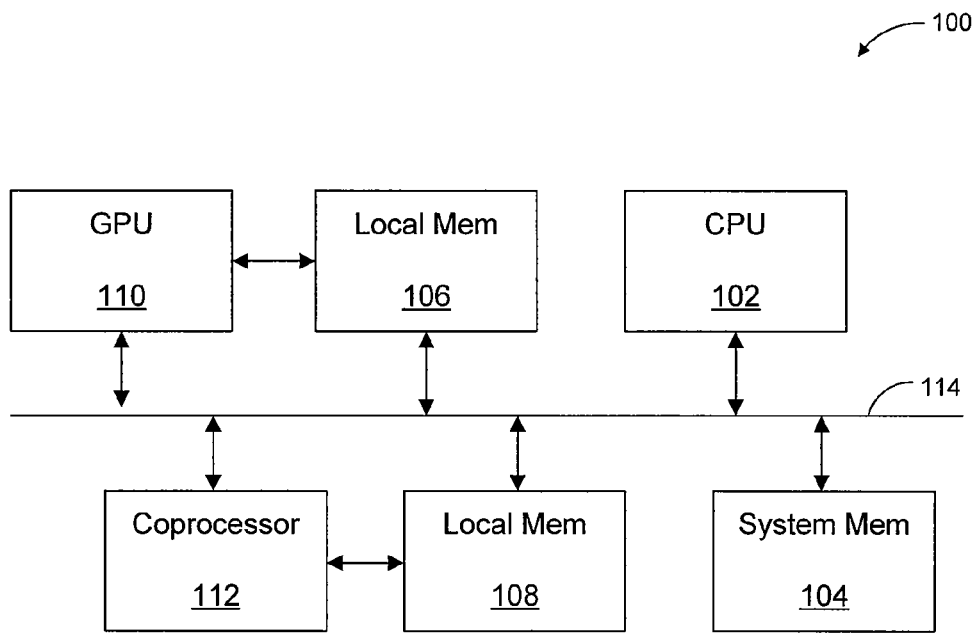
FIG. 1 is a block diagram of an example computing system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

Embodiments of the present invention are directed to a processing unit with a plurality of shader engines and applications thereof In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In accordance with an embodiment, the computing power of a processor is increased by providing the processor with a plurality of shader engines. Designing a processor with a plurality of shader engines, rather than simply increasing the width and/or depth of a single shader engine, promotes further scalability across a larger number of SIMDs. In an embodiment, the plurality of shader engines share access to a common cache system to reduce latency associated with providing data to the shader engines. In this embodiment, the plurality of shader engines and cache system may be configured to provide a processor with a substantially square floor plan. For example, the cache system (or at least portions thereof) may be positioned in a central location, with half of the shader engines accessing the cache system from one side and the other half of the shader engines accessing the cache system from the other side. The shader engines of the processor handle non-pixel shaders and pixel shaders differently.

For non-pixel shaders, each shader engine of the processor is unified. In other words, each shader engine is configured to process general-compute shaders (such as, for example, mathematical algorithms, physics simulations, etc.) and non-pixel graphics shaders (such as, for example, vertex shaders, geometry shaders, tessellation shaders, etc.). In an embodiment, the non-pixel shaders are sent to the plurality of shader engines in a round-robin fashion.

For pixel shaders, each shader engine of the processor is configured to process a particular subset of pixels to be displayed by a display device. The pixels of the display device are partitioned into a number of subsets corresponding to the number of shader engines. For example, in an embodiment in which the processor includes two shader engines, the pixels of the display device are partitioned into a first and second subset of pixels (such as, a checkerboard pattern, with even-numbered pixels of the checkerboard pattern comprising the first subset and odd-numbered pixels of the checkerboard pattern comprising the second subset). In this embodiment, a first shader engine of the processor is configured to process the pixels of the first subset, and a second shader engine of the processor is configured to process the pixels of the second subset. The processor may also include more than two (e.g., four, eight, etc.) shader engines. In this case, the pixels of the display device are partitioned into more than two (e.g., four, eight, etc.) subsets, with each subset of pixels being processed by a particular shader engine of the processor.

Processors of embodiments of the present invention may comprise GPUs, CPUs, video processing units (VPUs), coprocessors, and/or other types of processors that include or are configured to include a plurality of shader engines.

Further details of an example processor in accordance with an embodiment of the present invention are described below. Before providing these details, however, it is helpful to describe an example system in which such a processor may be implemented.

II. An Example System

FIG. 1 is a block diagram of an example computing system 100 according to an embodiment of the present invention. Computing system 100 includes a CPU 102, a GPU 110, and may optionally include a coprocessor 112. In the embodiment illustrated in FIG. 1, CPU 102 and GPU 110 are included on separate integrated circuits (ICs) or packages. In other embodiments, however, CPU 102 and GPU 110, or the collective functionality thereof, may be included in a single IC or package.

In addition, computing system 100 includes a system memory 104 that may be accessed by CPU 102, GPU 110, and coprocessor 112. In embodiments, computing system 100 may comprise a supercomputer, a desktop computer, a laptop computer, a video-game device, an embedded device, a handheld device (e.g., a mobile telephone, smart phone, MP3 player, a camera, a GPS device, etc.), or some other device that includes or is configured to include a GPU or the functionality thereof. Although not specifically illustrated in FIG. 1, computing system 100 may also include a display device (e.g., cathode-ray tube, liquid crystal display, plasma display, etc.) for displaying content (e.g., graphics, video, etc.) of computing system 100.

GPU 110 and coprocessor 112 communicate with CPU 102 and the system memory over a bus 114. Bus 114 may be any type of bus used in computer systems, including a peripheral component interface (PCI) bus, an accelerated graphics port (AGP) bus, a PCI Express (PCIE) bus, or another type of bus whether presently used or developed in the future.

GPU 110 and coprocessor 112 assist CPU 102 by performing certain special functions, usually faster than CPU 102 could perform them in software. For example, GPU 110 may process data-parallel computing tasks—such as, for example, graphics-processing tasks (including, for example, vertex shaders, geometry shaders, pixel shaders, etc.) and general-compute tasks (including, for example, mathematical algorithms, physics simulations, etc.). As described in more detail below, GPU 110 includes a plurality of shader engines in accordance with an embodiment of the present invention. The plurality of shader engines provide GPU 110 with increased compute power compared to a single shader engine GPU. Coprocessor 112 may comprise, but is not limited to, a floating point coprocessor, a GPU, a networking coprocessor, and other types of coprocessors and processors as would be apparent to a person skilled in the relevant art(s).

In addition to system memory 104, computing system 100 further includes local memory 106 and local memory 108. Local memory 106 is coupled to GPU 110 and may also be coupled to bus 114. Local memory 108 is coupled to coprocessor 112 and may also be coupled to bus 114. Local memories 106 and 108 are available to GPU 110 and coprocessor 112 respectively in order to provide faster access to certain data (such as data that is frequently used) than would be possible if the data were stored in system memory 104.

In an embodiment, GPU 110 and coprocessor 112 decode instructions in parallel with CPU 102 and execute only those instructions intended for them. In another embodiment, CPU 102 sends instructions intended for GPU 110 and coprocessor 112 to respective command buffers.

III. An Example Processor Having A Plurality of Shader Engines

Figure 2:
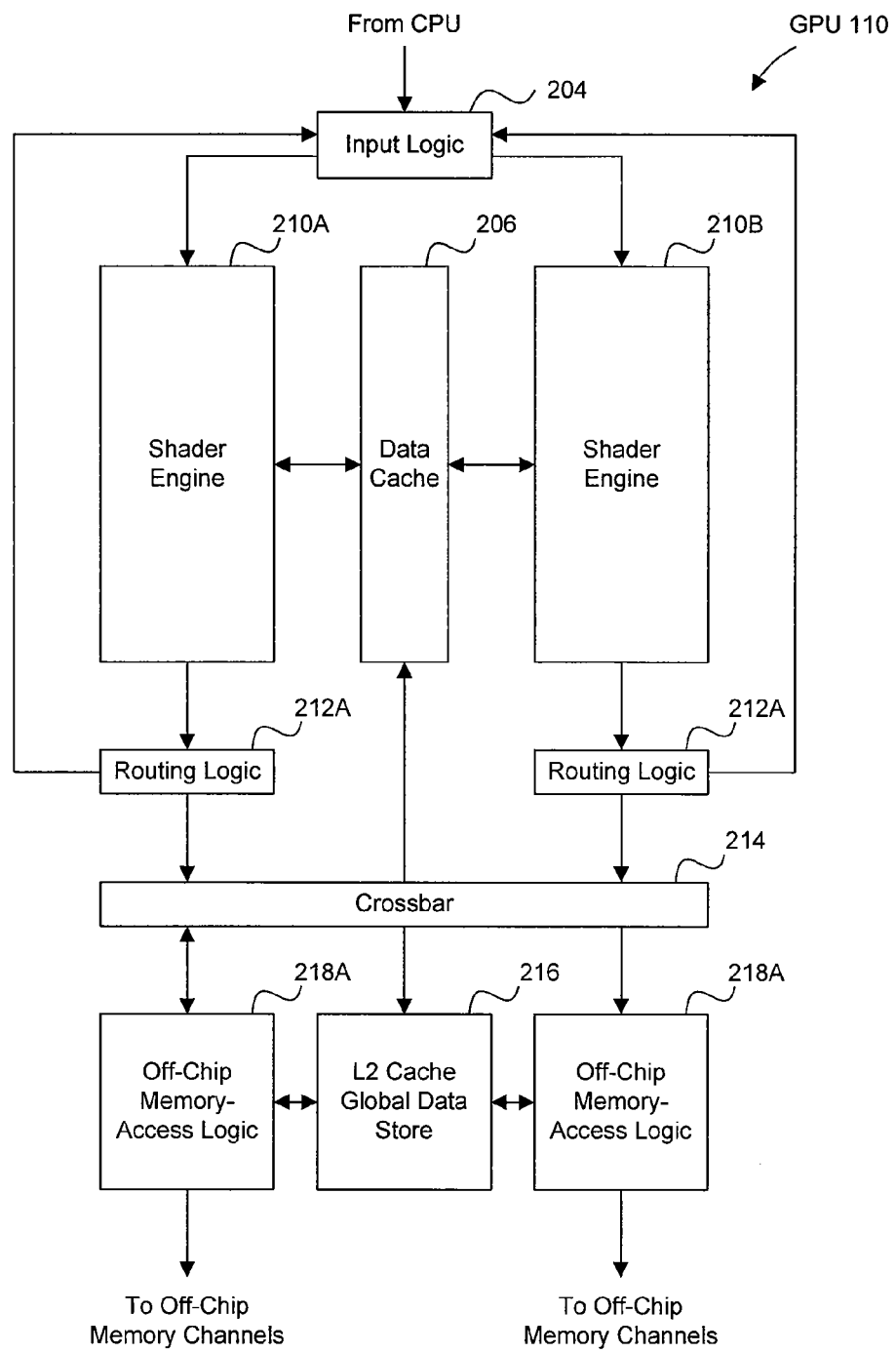
FIG. 2 is a block diagram of an example GPU with a plurality of split-screen, unified shader engines in accordance with an embodiment of the present invention.

FIG. 2 is a block diagram of an example processor having a plurality of shader engines in accordance with an embodiment of the present invention. For illustrative purposes only, and not limitation, the example processor is described below in terms of a GPU. A person skilled in the relevant art(s) will appreciate, however, that (as mentioned above) embodiments of the present invention may be applied to other types of processors—such as video processing units, central processing units, co-processors, and the like—that include a plurality of shader engines. These other types of processors are contemplated within the spirit and scope of the present invention.

As shown in the embodiment of FIG. 2, GPU 110 includes two shader engines—a first shader engine 210A and a second shader engine 210B. Shader engines 210 are unified with respect to non-pixel shaders, meaning that each shader engine 210 is configured to execute non-pixel graphics shaders (e.g., vertex shaders, geometry shaders, tessellation shaders, etc.) and general-compute shaders (e.g., mathematical algorithms, physics simulations, etc.). Each non-pixel shader simply recirculates through the array of processing elements of shader engines 210, rather than progressing to different shader engines in a pipeline.

Unlike non-pixel shaders, shader engines 210 are not unified with respect to pixel shaders. For pixel shaders, each shader engine 210 is configured to execute shader programs for a subset of pixels to be displayed on a display device. For example, first shader engine 210A may be configured to execute shader programs for a first subset (e.g., half) of pixels to be displayed on the display device, and second shader engine 210B may be configured to execute shader programs for a second subset (e.g., the other half) of pixels to be displayed on the display device.

Although FIG. 2 depicts a GPU with only two shader engines, it is to be appreciated that this is for illustrative purposes only, and not limitation. In an embodiment, GPU 110 may include more than two (e.g., four, eight, sixteen, etc.) shader engines. In such an embodiment, half the shader engines are located on one side of a data path (e.g., data cache 206), and the other half of the shader engines are located on the other side of the data path (e.g., data cache 206). Because half the shader engines are located on one side of the data path and the other half of the shader engines are located on the other side of the data path, GPU 110 may be configured to have a substantially square floor plan.

In addition to shader engines 210, FIG. 2 illustrates that GPU 110 also includes input logic 204, a cache system (including a (level-one (L1)) data cache 206, a (level-two (L2)) data cache 216), and output logic (including routing logic 212A-B, a crossbar 214, and off-chip, memory-access logic 218A-B). Each of these elements is described in more detail below.

A. Input Logic 204

Figure 3:
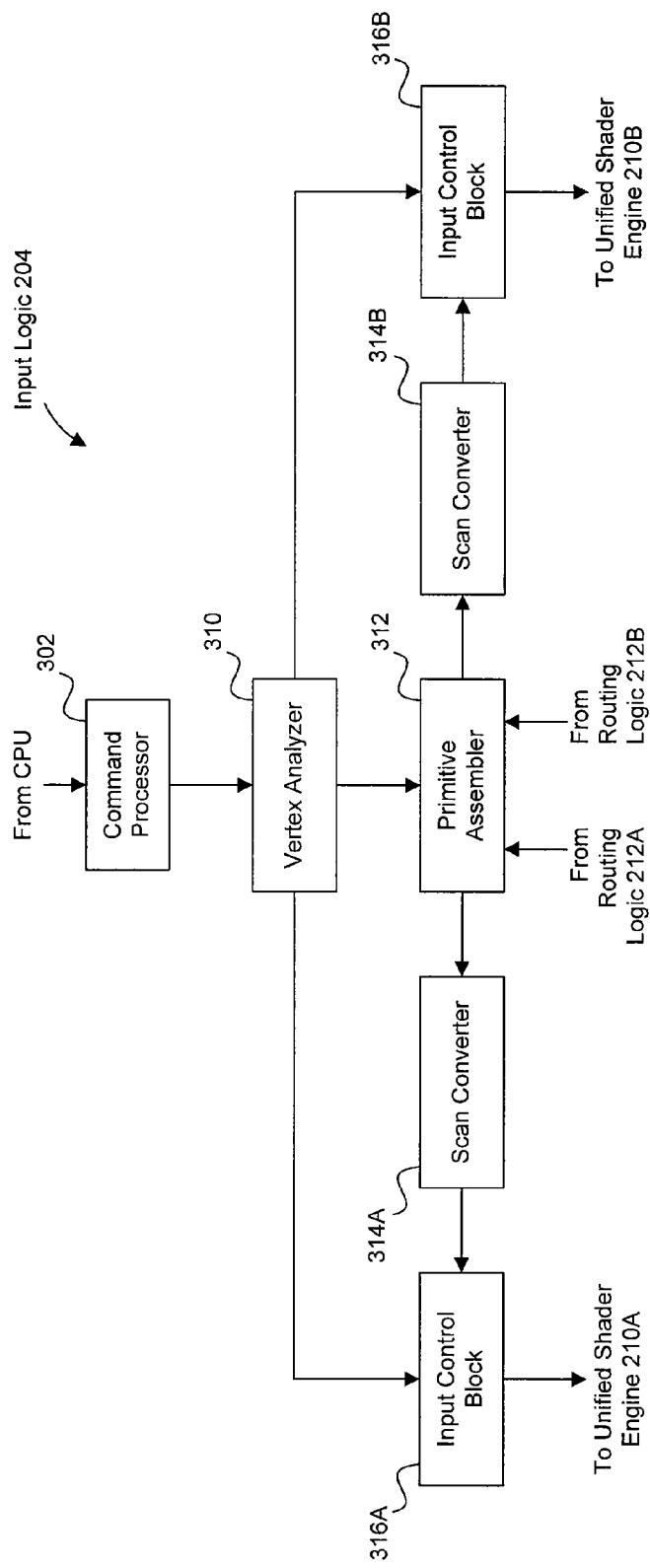
FIG. 3 is a block diagram of example input logic included in the GPU of FIG. 2.

Input logic 204 performs pre-processing on the graphics-processing tasks and general-compute tasks, and issues these tasks to shader engines 210. FIG. 3 illustrates an embodiment of input 204. As illustrated in the embodiment of FIG. 3, input logic 204 includes a command processor 302, a vertex analyzer 310, a primitive assembler 312, a first scan converter 314A, a second scan converter 314B, a first input-control block 316A, and a second input-control block 316B.

Command processor 302 receives graphics-processing and general-compute tasks from the CPU. Command processor 302 then passes these tasks to vertex analyzer 310.

Vertex analyzer 310 identifies all the shader programs associated with a graphics-processing and/or general-compute task. Vertex analyzer 310 schedules when each shader program can be launched in the shader engines 210 based on input and output data that will be available. For example, a particular graphics-processing task may require the execution of a first shader program and a second shader program, wherein the second shader program is dependent on data generated by the first shader program. In accordance with this example, vertex analyzer 310 identifies the first and second shader programs and schedules the first shader program to be executed before the second shader program, so that the data for the second shader program will be available when the second shader program is launched.

In addition to scheduling shader programs for launch, vertex analyzer 310 also generates pointers to a vertex buffer and includes connectivity data. The pointers are used to read vertices from a vertex buffer. If a vertex has already been processed and is stored in the vertex buffer, vertex analyzer 310 may read that vertex from the vertex buffer, so that a vertex is only processed one time. The connectivity data specifies how vertices fit together to make a primitive (e.g., triangle), so that the primitive can be rasterized properly.

Vertex analyzer 310 is coupled to primitive assembler 312 and input-control blocks 316. Some shader programs from vertex analyzer 310 are sent to primitive assembler 312, and others are sent to either first input-control block 316A or second input-control block 316B. In particular, pixel shaders are passed to primitive assembler 312; whereas general-compute shaders and non-pixel graphics shaders are passed to input-control blocks 316.

Primitive assembler 312 pre-processes (e.g., transforms, clips, etc.) primitives before they are sent to scan converters 314. As illustrated in the embodiment of FIG. 3, primitive assembler may receive primitives from vertex analyzer 310 or routing logic 212.

Scan converters 314 traverse the primitives to determine pixels to be processed by the different shader engines 210. In an embodiment, first scan converter 314A sends a first subset of pixels (e.g., even-numbered pixels of a checkerboard pattern) to first input-control block 316A for subsequent processing by first shader engine 210A, and second scan converter 314B sends a second subset of pixels (e.g., odd-numbered pixels of the checkerboard pattern) to second input-control block 316B for subsequent processing by second shader engine 210B.

In addition to receiving pixels from scan converters 314, input-control blocks 316 also receive non-pixel shaders from vertex analyzer 310, as mentioned above. In an embodiment, vertex analyzer 310 passes the non-pixel shaders (e.g., general-compute and non-pixel graphics shaders) to input-control blocks 316 in a round-robin fashion. For example, vertex analyzer 310 may sequentially schedule a stream of non-pixel shaders, comprising a first non-pixel shader, a second non-pixel shader, a third non-pixel shader, a fourth non-pixel shader, and so on. According to the round-robin distribution of non-pixel shaders, vertex analyzer 310 sends the first non-pixel shader to first input-control block 316A, the second non-pixel shader to second input-control block 316B, the third non-pixel shader to first input-control block 316A, the fourth non-pixel shader to second input-control block 316B, and so on.

Input-control blocks 316 determine where in shader engines 210 to send a particular workload. As briefly mentioned above and described in more detail below, each shader engine 210 includes a plurality of processing elements (e.g., SIMDs). Input-control block 316 identifies which processing elements (e.g., SIMDs) are available to process new workloads and sends the new workloads to the available processing elements (e.g., SIMDs). In particular, first input-control block 316A sends workloads to the processing elements (e.g., SIMDs) of first shader engine 210A, and second input-control block 316B sends workloads to the processing elements (e.g., SIMDs) of second shader engine 210B.

B. Shader Engines 210

Figures 4A, 4B:
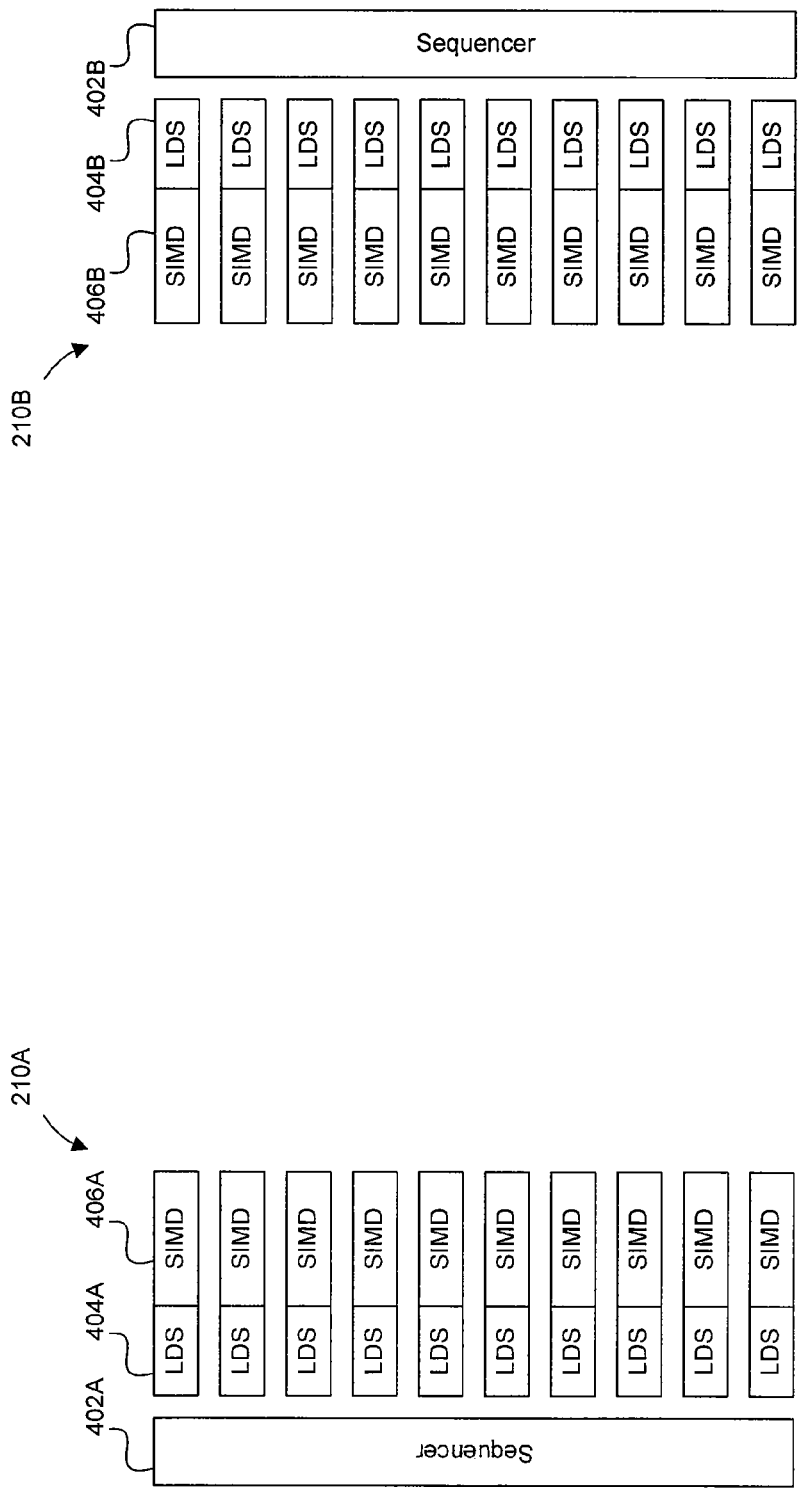
FIGS. 4A and 4B are block diagrams of example split-screen, unified shader engines of the GPU of FIG. 2.

FIGS. 4A and 4B respectively illustrate example details of first shader engine 210A and second shader engine 210B. As illustrated in the embodiment of FIGS. 4A and 4B, shader engines 210 are configured as mirror images of each other with respect to a central axis between the two shader engines. In this way, shader engines 210 may share common access to input/output (I/O) and other system resources (e.g., a single cache system), as explained in more detail below.

Referring to FIGS. 4A and 4B, each shader engine 210 includes a plurality of SIMDs 406, a plurality of local data shares (LDS) 404, and a sequencer 402. SIMDs 406 are the data-parallel processing elements of each shader engine 210. In an embodiment, each shader engine includes ten rows of SIMDs 406, with each row comprising four groups of four-element arithmetic-logic units (ALUs). Each LDS 404 stores data used by a row of SIMDs 406. Sequencer 402 keeps track of which workloads are being processed by the different SIMDs 406 within the shader engines 210, enabling a plurality of threads to execute in parallel. In an embodiment, for example, more than 30,000 threads may execute in each shader engines 210 at any one time. The data needed by SIMDs 406 to execute these threads may be retrieved from a cache system.

C. Cache System

Referring back to FIG. 2, the cache system includes L1 data cache 206, L2 data cache 216, and off-chip, memory-access logic 218. When data is needed by shader engines 210 to execute a shader program, first a request is made to L1 data cache 206. If there is a cache hit in L1 data cache 206 (i.e., the requested data is in L1 data cache 206), the data is forwarded to either first shader engine 210A or second shader engine 210B, depending on which shader engine requested the data. If there is a cache miss in L1 data cache 206 (i.e., the requested data is not in L1 data cache 206), L1 data cache 206 forwards the request to L2 data cache 216. L2 data cache 216 is a cache memory unit that is larger than L1 data cache 206, but due to its larger size it typically takes a longer amount of time to determine whether the requested data is included in L2 data cache 216. If there is a cache hit in L2 data cache 216, the requested data is stored in L1 data cache 206 and is forwarded to the shader engine 210 that requested the data. If there is a cache miss in L2 data cache 216, the requested data is retrieved from off-chip memory via off-chip, memory-access logic 218.

Figure 5:
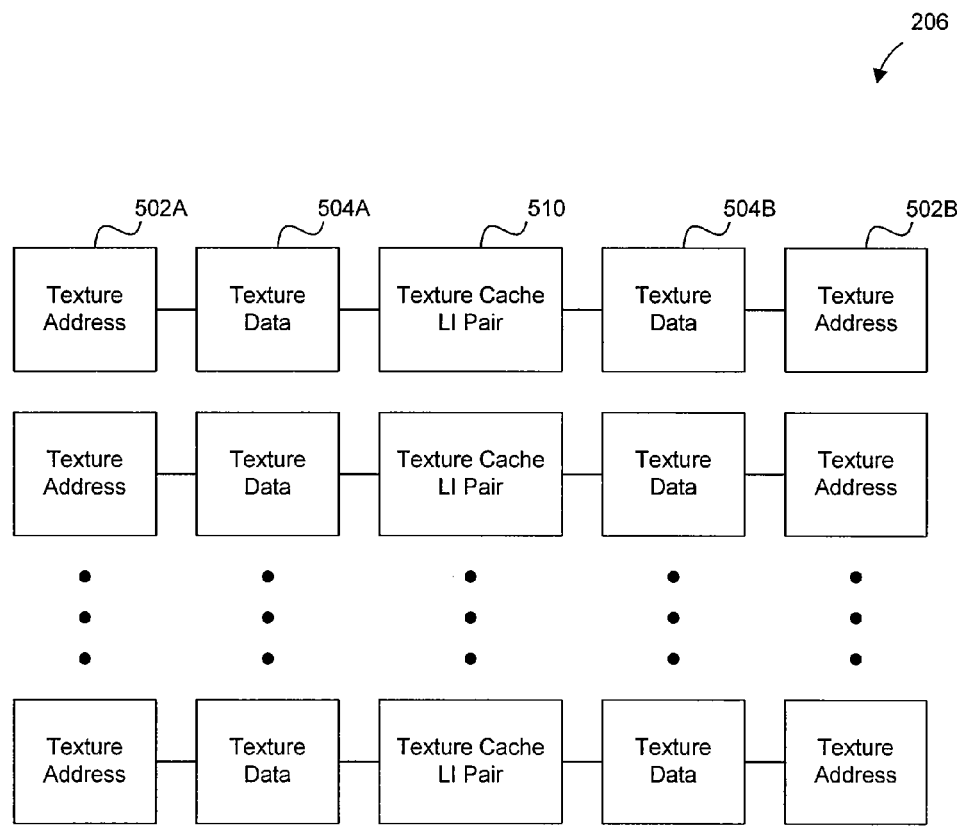
FIG. 5 is a block diagram of an example level-one (L1) data cache shared by the shader engines of the GPU of FIG. 2.

FIG. 5 illustrates an embodiment of L1 data cache 206. As illustrated in the embodiment of FIG. 5, L1 data cache 206 includes a plurality of rows of logic blocks corresponding to the plurality of SIMDs 406 of each shader engine 210. Each row of logic blocks of L1 data cache 206 includes a first texture-address unit 502A, a first texture-data unit 504A, a texture-cache/L1 pair 510, a second texture-data unit 504B, and a second texture-address unit 502B.

Texture-address units 502 generate texture addresses based on state data from sequencers 402. In this way, appropriate texture data can be loaded into local memory for subsequent processes. First texture-address unit 502A generates texture addresses for first shader engine 210A, and second texture-address unit 502B generates texture addresses for second shader engine 210B.

Texture-data units 504 filter and return data to the shader engines 210. First texture-data unit 504A is coupled to first shader engine 210A, and second texture-data unit 504B is coupled to second shader engine 210B.

Texture-cache/L1 pair 510 performs level one caching of data. As explained above, if there is a miss in texture-cache/L1 pair 510, a request is made to L2 data cache 216. Texture-cache/L1 pair 510 services data requests from both first shader engine 210A and second shader engine 210B. In this way, the latency associated with retrieving data for the shader engines 210 can be reduced.

D. Output Logic

After executing a shader program, shader engines 210 pass the results to output logic. Referring to FIG. 2, the output logic includes routing logic 212, crossbar 214, and off-chip, memory-access logic 218. As illustrated in FIG. 2, first shader engine 210 A passes results to first routing logic 212A, and second shader engine 210B passes results to second routing logic 212B.

Each routing logic 212 includes an export buffer. To keep the SIMDs 406 of shader engines 210 busy, workloads may be issued to shader engines 210 out of rasterization order. However, the results from shader engines 210 should eventually be combined back in rasterization order to ensure that pixels are properly displayed on a display device. Including an export buffer in each routing logic 212 allows shader engines 210 to export results out of rasterization order.

Each routing logic 212 also includes logic to properly route the results of shader engines 210. As illustrated in FIG. 2, routing logic 212 may route results from shader engines 210 to any of the following locations: (i) input logic 204, wherein the results will be subsequently processed by either first shader engine 210A or second shader engine 210B; (ii) first off-chip, memory-access logic 218A, wherein the results will be subsequently written to one of a first plurality of off-chip memory channels; or (iii) second off-chip, memory-access logic 218B, wherein the results will be subsequently written to one of a second plurality of off-chip memory channels. First routing logic 212A may pass results directly to first off-chip, memory-access logic 218A, but uses crossbar 214 to pass results to second off-chip, memory-access logic 218B. Similarly, second routing logic 212B may pass results directly to second off-chip, memory-access logic 218B, but uses crossbar 214 to pass results to first off-chip, memory-access logic 218A. In an embodiment, crossbar 214 comprises a thirty-two pixel crossbar, wherein each pixel comprises one-hundred, twenty-eight bits.

Figure 6:
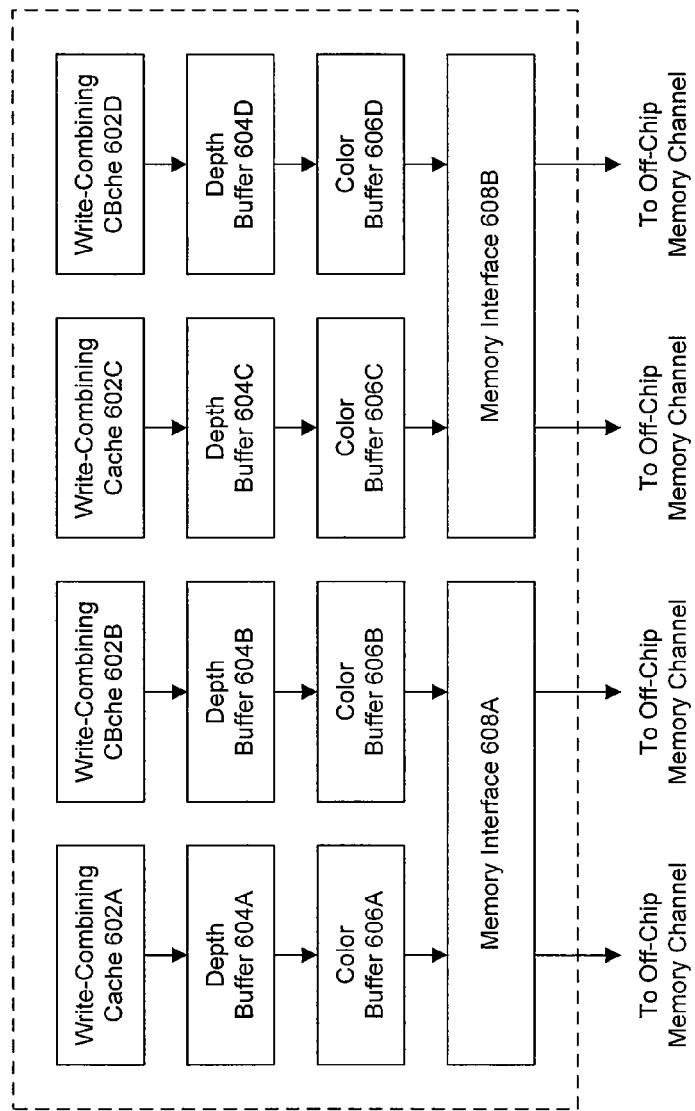
FIG. 6 is a block diagram of example off-chip, memory-access logic included in the GPU of FIG. 2.

FIG. 6 illustrates example details of off-chip, memory-access logic 218. As illustrated in the embodiment of FIG. 6, off-chip, memory-access logic 218 includes a plurality of write-combining caches 602A-D, a plurality of depth buffers 604A-D, a plurality of color buffers 606A-D, a first memory interface 608A, and a second memory interface 608B. Write-combining cache 602 combine data to be written to off-chip memory, enabling efficient access to off-chip memory. Depth buffers 604 buffer results for z-testing. Color buffers 606 buffer results for color blending. Each memory interface 608 comprises a dual-channel memory controller. Because off-chip, memory-access logic 218 includes two dual-channel memory controllers, each off-chip, memory-access logic 218 provides access to four different off-chip memory channels.

IV. An Example Computing System

Figure 7:
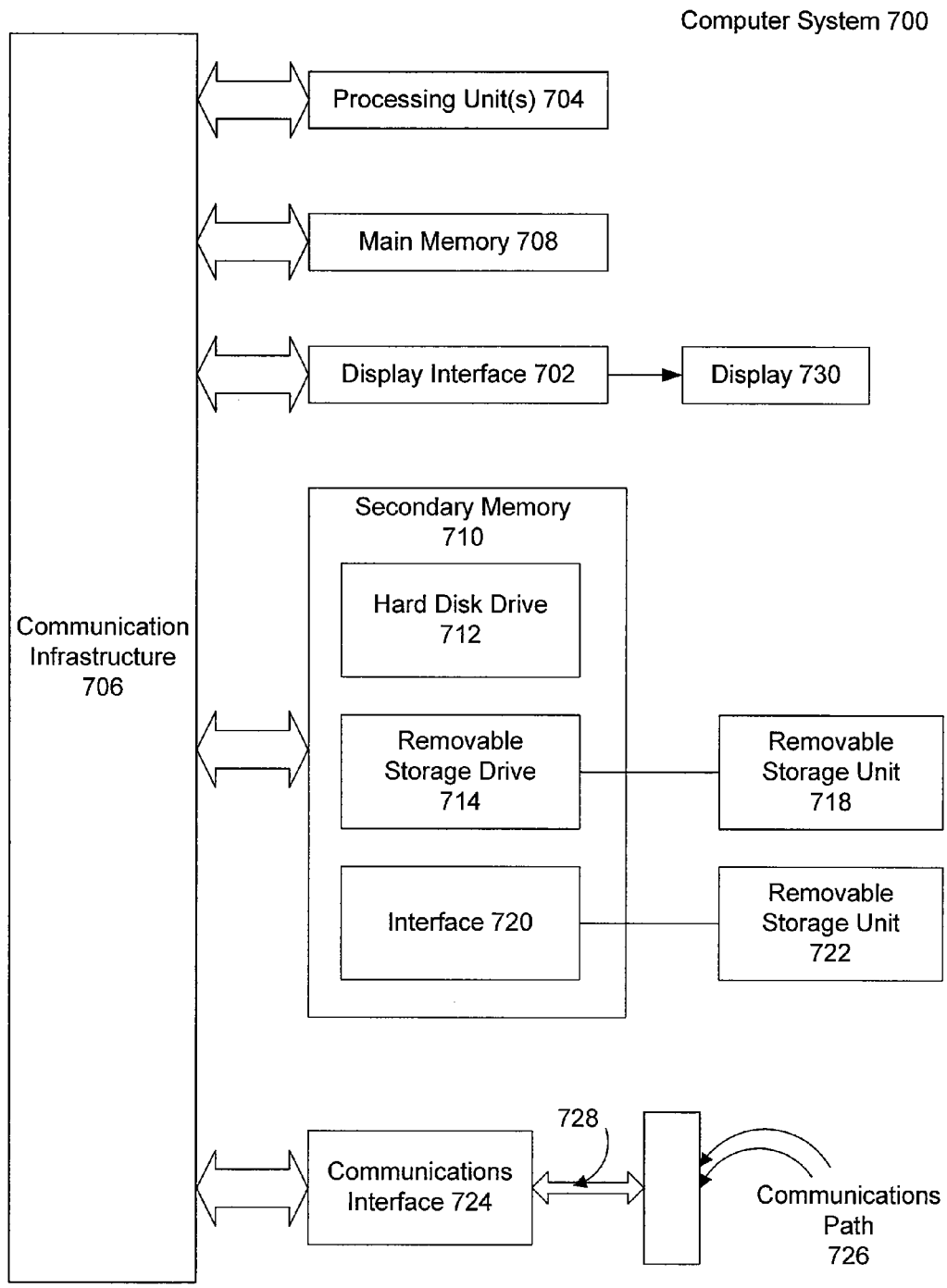
FIG. 7 is an example computing system in accordance with an embodiment of the present invention.

As set forth above, FIG. 1 illustrates an example computing system of an embodiment of the present invention. FIG. 7 illustrates additional components that may be included in an example computing system 700 in accordance with an embodiment of the present invention.

Computing system 700 includes one or more processing units 704. Processing unit(s) 704 may be a general-purpose processing unit (such as, CPU 102 of FIG. 1) or a special-purpose processing unit (such as, GPU 110 of FIG. 1). Processing unit(s) 704 is (are) connected to a communication infrastructure 706 (e.g., a communications bus (such as bus 114 of FIG. 1), a cross-over bar, or a network).

Computing system 700 also includes a display interface 702 that forwards graphics, text, and other data from communication infrastructure 706 (or from a frame buffer not shown) for display on display unit 730 (such as, a liquid crystal display).

Computing system 700 also includes a main memory 708, preferably random access memory (RAM), such as system memory 104 of FIG. 1. In addition, computing system 700 may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer-readable storage medium having stored therein computer software and/or data.

In alternative embodiments, secondary memory 710 may include other similar devices for allowing computer programs or other instructions to be loaded into computing system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computing system 700.

Computing system 700 may also include a communications interface 724. Communications interface 724 allows software and data to be transferred between computing system 700 and external devices. Examples of communications interface 724 may include a modem, a network interface (such as an Ethernet card), a communications port, a Personal Computer Memory Card International Association (PCM- CIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, an radio frequency (RF) link and other communications channels.

In this document, the term "computer-readable storage medium" is used to generally refer to media such as removable storage drive 714 and a hard disk installed in hard disk drive 712. These computer program products provide software to computing system 700.

Computer programs (also referred to as computer control logic) are stored in main memory 708 and/or secondary memory 710. Computer programs may be loaded into computing system 700 using removable storage drive 714, hard drive 712 or communications interface 724. Such computer programs, when executed, enable the computing system 700 to perform the features of the present invention, as discussed herein.

For example, the computer programs, when executed, enable at least one of processing unit 704 to process shaders in accordance with an embodiment of the present invention. An example of such an operation is described below.

V. Example Operation

Figure 8:
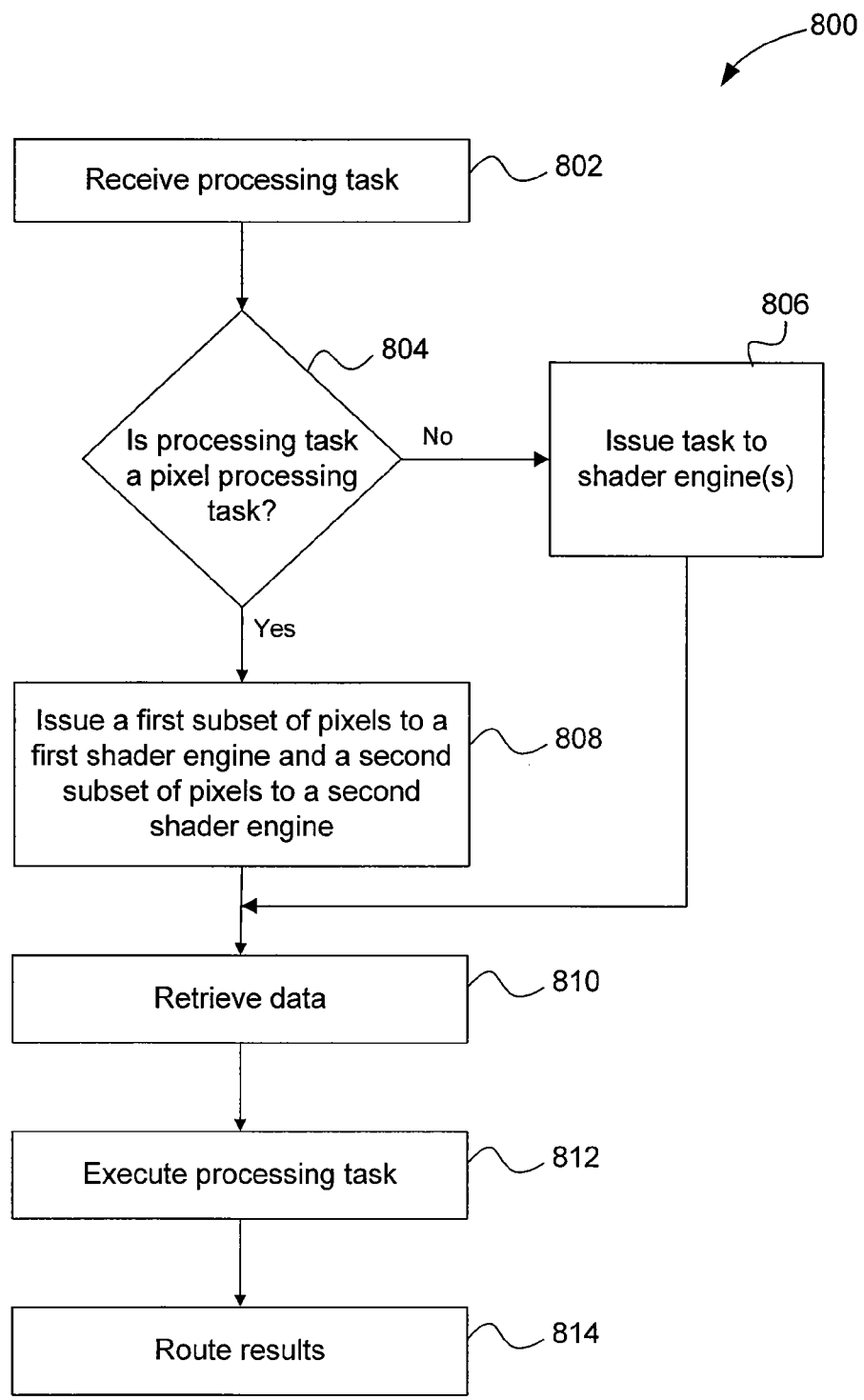
FIG. 8 is a flowchart illustrating an example method in accordance with an embodiment of the present invention.

FIG. 8 is a flowchart illustrating an example method 800, implemented by a processing unit, for processing shaders in accordance with an embodiment of the present invention. Method 800 begins at a step 802 in which a processing tasks is received. For example, GPU 110 may receive graphics-processing and/or general-compute tasks from CPU 102.

In step 804, it is determined whether the received processing task is a pixel processing task. If in step 804 it is determined that the received processing task is not a pixel processing task, then the received task is issued to any of a plurality of shader engines, as illustrated in a step 806. For example, as described above, input logic 204 of GPU 110 may send workloads associated with the execution of non-pixel shaders to either first shader engine 210A or second shader engine 210B in an alternating (e.g., round-robin) fashion.

If, on the other hand, it is determined in step 804 that the received processing task is a pixel processing task, then a first subset of pixels associated with the received task is issued to a first shader engine and a second subset of pixels associated with the received task is issued to a second shader engine, as illustrated in a step 808. For example, as described above, for pixel shaders, input logic 204 may send even-numbered pixels of a checkerboard pattern to first shader engine 210A and may send odd-numbered pixels of the checkerboard pattern to second shader engine 210B.

In step 810, data needed to execute the processing task is retrieved. For example, after being issued workloads for execution, shader engines 210 retrieve the data necessary to execute these workloads. The data may be retrieved from the cache system (comprising L1 data cache 206, L2 data cache 216, and off-chip, memory-access logic 218), as described above.

In step 812, the processing task is executed. The results from shader engines 210 are then routed to the appropriate location by routing logic 212, as illustrated in step 814. Importantly, crossbar 214 allows results from both shader engines 210 to be written to any off-chip memory channel via either first off-chip, memory-access logic 218A or second off-chip, memory-access logic 218B.

VI. Example Software Implementations

In addition to hardware implementations of processors of embodiments of the present invention (e.g., GPU 110), such processors may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein (such as executing graphics-processing and general-compute tasks in GPU 110); (ii) the fabrication of the systems and techniques disclosed herein (such as the fabrication of GPU 110); or (iii) a combination of the functions and fabrication of the systems and techniques disclosed herein.

For example, this can be accomplished through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

VII. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A processor comprising:
   a first shader engine configured to process pixel shaders for a predetermined first subset of pixels to be displayed on a display device, wherein the first shader engine comprises a first plurality of SIMD (single-instruction, multiple-data) units; and
   a second shader engine configured to process pixel shaders for a predetermined second subset of pixels to be displayed on the display device, wherein the second shader engine comprises a second plurality of SIMD units;
   a level-one (L1) data cache coupled to and physically positioned between the first and second shader engines, wherein the L1 data cache shares data between at least one of the first plurality of SIMD units and at least one of the second plurality of SIMD units thereby reducing the latency of providing data; and
   an input logic configured, for pixel shaders, to partition the pixels to be displayed on the display device into the first subset and the second subset; and
   wherein the input logic is also configured to allocate general-compute shaders and non-pixel graphics shaders to an available one of the first shader engine and the second shader engine, wherein the first and second engines are each further configured to process the general-compute shaders and the non-pixel graphics shaders;
   whereby the shader engines are unified with respect to non-pixel shaders and not unified with respect to pixel shaders.

2. The processor of claim 1, wherein the first shader engine and the second shader engine are configured as mirror images of each other with respect to a central axis between them, and the L1 data cache is arranged between them where the first shader engine accesses the cache from one side and the second shader engine accesses the cache from the other side to provide a substantially square floor plan for the shader engines and cache.

3. The processor of claim 1, wherein the L1 data cache is coupled to a level-two (L2) data cache, and wherein the partitioning of pixels is based on the number of shader engines.

4. The processor of claim 1, further comprising:
a third shader engine configured to process pixel shaders for a third subset of pixels to be displayed on the display device; and
a fourth shader engine configured to process pixel shaders for a fourth subset of pixels to be displayed on the display device;
wherein the L1 data cache is coupled to and positioned between the third and fourth shader engines;
wherein the third and fourth shader engines are each further configured to process general-compute shaders and non-pixel graphics shaders; and
wherein the input logic is further configured to partition the pixels to be displayed on the display device into the third subset and the fourth subset, and further configured to allocate general-compute shaders and non-pixel graphics shaders to an available one of the first shader engine, the second shader engine, the third shader engine and the fourth shader engine.

5. The processor of claim 4, wherein the input logic is further configured to partition the pixels into a number of subsets based on the number of shader engines.

6. The processor of claim 4, wherein the input logic comprises:
a first scan converter configured to scan the workloads and identify the first subset of pixels to be processed by the first shader engine; and
a second scan converter configured to scan the workloads and identify the second subset of pixels to be processed by the second shader engine.

7. The processor of claim 6, further comprising:
first output logic coupled to the first shader engine and a first plurality of off-chip memory channels, enabling results data from the first shader engine to be provided to any of the first plurality of off-chip memory channels; and
second output logic coupled to the second shader engine and a second plurality of off-chip memory channels, enabling results data from the second shader engine to be provided to any of the second plurality of off-chip memory channels.

8. The processor of claim 7, further comprising:
a crossbar that provides
(i) a first data path from the first shader engine to the second plurality of off-chip memory channels, and
(ii) a second data path from the second shader engine to the first plurality of off-chip memory channels.

9. A computer-program product comprising a non-transitory computer-readable storage medium containing instructions which, when executed on a computing device, define a processor, wherein the processor comprises:
a first shader engine configured to process pixel shaders for a first subset of pixels to be displayed on a display device, wherein the first shader engine comprises a first plurality of SIMD (single-instruction, multiple-data) units;
a second shader engine configured to process pixel shaders for a second subset of pixels to be displayed on the display device, wherein the second shader engine comprises a second plurality of SIMD units;
a level-one (L1) data cache coupled to and physically positioned between the first and second shader engines, wherein the L1 data cache shares data between at least one of the first plurality of SIMD units and at least one of the second plurality of SIMD units reducing the latency associated with providing data to shader engine SIMD units; and
an input logic configured, for pixel shaders, to partition the pixels to be displayed on the display device into the first subset and the second subset, and configured to allocate general-compute shaders and non-pixel graphics shaders to an available one of the first shader engine and the second shader engine,
wherein the first and second shader engines are each further configured to process general-compute shaders and non-pixel graphics shaders;
whereby the shader engines are unified with respect to non-pixel shaders and not unified with respect to pixel shaders.

10. The computer-program product of claim 9, wherein the first shader engine and the second shader engine are configured as mirror images of each other with respect to a central axis between them, and the L1 data cache is arranged between them where the first shader engine accesses the cache from one side and the second shader engine accesses the cache from the other side to provide a substantially square floor plan for the shader engines and the cache.

11. The computer-program product of claim 9, wherein the L1 data cache is coupled to a level-two (L2) data cache, and wherein the partitioning of pixels is based on the number of shader engines.

12. The computer-program product of claim 9, wherein the processor further comprises:
a third shader engine configured to process pixel shaders for a third subset of pixels to be displayed on the display device; and
a fourth shader engine configured to process pixel shaders for a fourth subset of pixels to be displayed on the display device; and
wherein the L1 data cache is coupled to and positioned between the third and fourth shader engines;
wherein the third and fourth shader engines are each further configured to process general-compute shaders and non-pixel graphics shaders; and
wherein the input logic is further configured to partition the pixels to be displayed into the third subset and the fourth subset, and further configured to allocate general-compute shaders and non-pixel graphics shaders to an available one of the first shader engine, the second shader engine, the third shader engine and the fourth shader engine.

13. The computer-program product of claim 12, wherein the input logic is further configure to partition the pixels based on the number of shader engines.

14. The computer-program product of claim 12, wherein the input logic comprises:
a first scan converter configured to scan the workloads and identify the first subset of pixels to be processed by the first shader engine; and a second scan converter configured to scan the workloads and identify the second subset of pixels to be processed by the second shader engine.

15. The computer-program product of claim 9, wherein the processor further comprises:
   first output logic coupled to the first shader engine and a first plurality of off-chip memory channels, enabling results data from the first shader engine to be provided to any of the first plurality of off-chip memory channels; and
   second output logic coupled to the second shader engine and a second plurality of off-chip memory channels, enabling results data from the second shader engine to be provided to any of the second plurality of off-chip memory channels.

16. The computer-program product of claim 15, wherein the processor further comprises:
   a crossbar that provides
      (i) a first data path from the first shader engine to the second plurality of off-chip memory channels, and
      (ii) a second data path from the second shader engine to the first plurality of off-chip memory channels.

17. A method for processing shaders in a processing unit, comprising:
   processing, in a first shader engine, pixel shaders for a predetermined first subset of pixels to be displayed on a display device, wherein the first shader engine comprises a first plurality of SIMD (single-instruction, multiple-data) units;
   processing, in a second shader engine, pixel shaders for a predetermined second subset of pixels to be displayed on the display device, wherein the second shader engine comprises a second plurality of SIMD units;
   processing, in both the first and second shader engines, general-compute shaders and non-pixel graphics shaders;
   partitioning, by an input logic, the pixels to be displayed on the display device into the first subset and the second subset;
   allocating, by the input logic, general-compute shaders and non-pixel graphics shaders to an available one of the first shader engine and the second shader engine; and
   using a level-one (L1) data cache coupled to and physically positioned between the first and second shader engines, wherein the L1 data cache shares data between at least one of the first plurality of SIMD units and at least one of the second plurality of SIMD units thereby reducing the latency of providing data;
   whereby the shader engines are unified with respect to non-pixel shaders and not unified with respect to pixel shaders.

18. The method of claim 17, further comprising:
   identifying, using a first scan converter, the first subset of pixels to be processed by the first shader engine; and
   identifying, using a second scan converter, the second subset of pixels to be processed by the second shader engine.

19. The method of claim 17, further comprising:
   processing, in a third shader engine, pixel shaders for a third subset of pixels to be displayed on the display device; and
   processing, in a fourth shader engine, pixel shaders for a fourth subset of pixels to be displayed on the display device, and
   wherein partitioning the pixels to be displayed on the display device includes partitioning the pixels into the third subset and the fourth subset, and
   wherein the allocating further includes allocating general-compute shaders and non-pixel graphics shaders to an available one of the first shader engine, the second shader engine, the third shader engine and the fourth shader engine.

20. A computing system, comprising:
   a memory;
   a processing unit; and
   a bus coupled to the memory and the processing unit, wherein the processing unit comprises:
   a first shader engine configured to process pixel shaders for a first subset of pixels to be displayed on a display device, wherein the first shader engine comprises a first plurality of SIMD (single-instruction, multiple-data) units;
   a second shader engine configured to process pixel shaders for a second subset of pixels to be displayed on the display device, wherein the second shader engine comprises a second plurality of SIMD units;
   a level-one (L1) data cache coupled to and physically positioned between the first and second shader engines thereby reducing the latency of providing data, wherein the L1 data cache shares data between at least one of the first plurality of SIMD units and at least one of the second plurality of SIMD units; and
   an input logic configured, for pixel shaders, to partition the pixels to be displayed on the display device into the first subset and the second subset, and configured to allocate general-compute shaders and non-pixel graphics shaders to an available one of the first shader engine and the second shader engine,
   wherein the first and second shader engines are each further configured to process general-compute shaders and non-pixel graphics shaders, whereby the shader engines are unified with respect to non-pixel shaders and not unified with respect to pixel shaders.

21. The computing system of claim 20, wherein the first shader engine and the second shader engine are configured as mirror images of each other with respect to a central axis between tem, and the L1 data cache is arranged between them where the first the first shader engine accesses the cache from one side and the second shader engine accesses the cache from the other side to provide a substantially square floor plan for the shader engines and the cache.

22. The computing system of claim 20, wherein the L1 data cache is coupled to a level-two (L2) data cache, and wherein the partitioning of pixels is based on the number of shader engines.

23. The computing system of claim 20, wherein the processing unit further comprises:
   a third shader engine configured to process pixel shaders for a third subset of pixels to be displayed on the display device; and
   a fourth shader engine configured to process pixel shaders for a fourth subset of pixels to be displayed on the display device;
   wherein the L1 data cache is coupled to and positioned between the third and fourth shader engines, and
   wherein the third and fourth shader engines are each further configured to process general-compute shaders and non-pixel graphics shaders, and
   wherein the input logic is further configured to partition the pixels to be displayed on the display device into the third subset and the fourth subset, and further configured to allocate general-compute shaders and non-pixel graphics shaders to an available one of the first shader engine, the second shader engine, the third shader engine and the fourth shader engine.

24. The computing system of claim 23, wherein the input logic is further configured to partition the pixels based on a number of shader engines.

25. he computing system of claim 24, wherein the input logic comprises:
   a first scan converter configured to scan the workloads and identify the first subset of pixels to be processed by the first shader engine; and
   a second scan converter configured to scan the workloads and identify the second subset of pixels to be processed by the second shader engine.

26. The computing system of claim 20, wherein the processing unit further comprises:
   first output logic coupled to the first shader engine and a first plurality of off-chip memory channels, enabling results data from the first shader engine to be provided to any of the first plurality of off-chip memory channels; and
   second output logic coupled to the second shader engine and a second plurality of off-chip memory channels, enabling results data from the second shader engine to be provided to any of the second plurality of off-chip memory channels.

27. The computing system of claim 26, wherein the processing unit further comprises:
   a crossbar that provides
      (i) a first data path from the first shader engine to the second plurality of off-chip memory channels, and
      (ii) a second data path from the second shader engine to the first plurality of off-chip memory channels.

* * * * *